Patented June 13, 1950

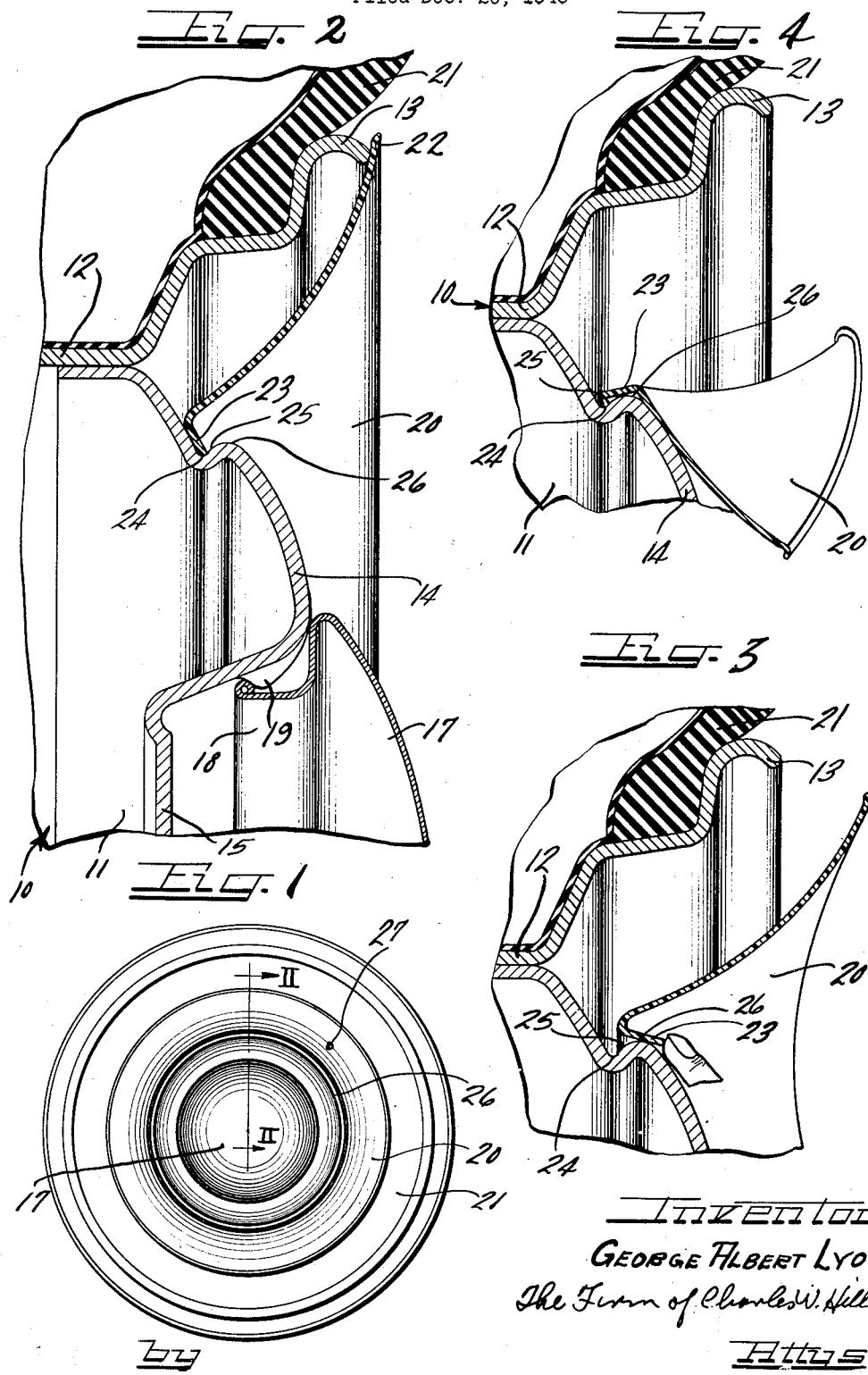

2,510,990

UNITED STATES PATENT OFFICE 2,510,990

WHEEL COVER

George Albert Lyon, Allenhurst, N. J.

Application December 20, 1946, Serial No. 717,350

6 Claims. (Cl. 301—37)

1

This invention relates to improvements in wheel structures and more particularly concerns a novel wheel and cover assembly.

An important object of the invention resides in the provision of a novel wheel structure for use with an ornamental cover and having unique means for maintaining the cover assembled therewith.

Another object of this invention is to provide a novel structure for mounting a plastic trim ring.

A further object of the invention is to provide a novel wheel structure and trim ring assembly wherein the trim ring is directly engageable with the cover assembly in a manner to be readily replaceable.

Still another object of the invention is to provide a wheel structure having novel means for retaining a resiliently flexible ornamental cover in direct snap-on relationship without the use of clips or other separately formed retaining means.

It is also an object of the invention to provide a wheel structure including a tire rim and a load-sustaining body part wherein the body part has means formed integrally thereon for interlocking retention of a cover member for concealing the tire rim and the juncture of the tire rim and the body part.

In accordance with the general features of this invention, there is provided a wheel structure including a tire rim and a load-bearing part, the load-bearing part having an annular generally radially outwardly and axially inwardly facing shoulder spaced radially inwardly from the juncture of the body part and the tire rim, and a cover member which is dimensioned to extend in concealing relation to the tire rim and said juncture has a resiliently flexible radially inner portion interengaging with and behind said shoulder to retain the cover on the wheel.

Another feature of the invention relates to the provision of a wheel structure including a tire rim and a load-sustaining body part and a sheet plastic flexibly resilient cover member for ornamentally concealing the outer side of the tire rim and the tire rim juncture portion of the body part and having an inner marginal generally radially inwardly and axially outwardly extending annular flange which not only reinforces the inner margin of the cover but also seats directly against the body part of the wheel spaced radially inwardly from the juncture of the rim and body part, the body part having an integral cover retaining annular generally radially outwardly opening groove within which the edge of said flange is interlockingly engaged, the axially outer portion of said groove extending radially outwardly in concealing relation to the

2 juncture of the edge of said flange with the body part in said groove.

Still another feature of the invention relates to the construction and relationship of the inner marginal flange of the cover and the over-hanging, retaining portion of the body member at the axially outer side of the cover retaining groove so that the cover is adapted to be assembled with the wheel structure by simple axially inward pressure against the cover adjacent to the inner marginal flange whereby to stretch the flange by cammingly moving it axially inwardly thereby until the flange snaps into the retaining groove.

Yet another feature of the invention resides in the relationship and construction of the retaining groove and shoulder structure of the wheel body part and the inner marginal reinforcing and retaining flange of the cover so that the cover can be manually removed from the wheel by flexing a portion thereof to turn it upon itself and pulling such portion radially inwardly whereby to turn the inner marginal flange contiguous to such portion into a generally axially inwardly extending direction and then sliding it axially outwardly past the retaining shoulder of the groove.

Other objects, features and advantages of the present invention will be fully apparent from the following detailed description of a preferred embodiment thereof, taken in conjunction with the accompanying drawings, in which:

Figure 1 is an outer side elevational view of a wheel structure embodying the features of the present invention;

Figure 2 is an enlarged fragmentary radial sectional view taken substantially in the plane of line II—II of Fig. 1;

Figure 3 is a fragmentary radial sectional view taken substantially in the same plane as Fig. 2 but showing the cover member in process of assembly; and Figure 4 is a fragmentary sectional view substantially like Fig. 3 but showing the cover in process of being removed from the wheel.

As shown on the drawings:

The wheel structure selected as exemplary of the present invention comprises a tire rim 10 and a load-sustaining part or body 11. Both the tire rim and the wheel body may be formed from suitable gauge sheet metal rolled or stamped to the desired shape. The tire rim 10 may be of the conventional drop center, multi-flanged type having a base flange 12 to which the wheel body 11 is secured in any suitable manner. At its outer side, the tire rim is formed with an annular terminal flange 13. The wheel body 11 includes an annular intermediate axially outwardly protruding reinforcing nose portion 14 which defines a centrally dished portion including a bolt-on flange 15 by which the wheel is adapted to be secured to part of a vehicle axle by means of cap screws or bolts (not shown). The centrally dished portion of the wheel is adapted to be closed by a removable hub cap 17 having a generally axially inwardly extending terminally beaded retention flange 18 engageable with retaining means such as bumps 19 projecting generally radially inwardly from the radially inner side of the nose portion 14.

According to the present invention, the wheel body 11 is formed adjacent to but spaced radially inwardly from the juncture with the tire rim with means for retaining an ornamental cover member 20. Such cover member is adapted to be made from a flexibly resilient material so as to be readily deflectable from a predetermined shape but will of its own resilience return to such shape when the deflecting pressure or force is released therefrom. For this purpose, a suitable material comprises a synthetic plastic such as ethyl cellulose, cellulose acetate or vinyl resin.

As shown herein, the cover 20 is in the form of a trim ring or annulus having a cross-sectional extent and contour to lie in substantially full concealing relation to the outer side of the tire rim 12 and the juncture of the tire rim and wheel body. To this end, the cover member 20 is of convex cross-sectional shape generally simulative of the adjacent side wall of a tire 21 carried by the tire rim 12, and where the cover member 20 is colored white or egg shell it simulates generally a radially inward white wall extension of the tire side wall. This affords the impression of a massive white wall tire extending clear down to the wheel body part 11.

The outer margin of the cover member 20 is preferably formed with a reinforcing rib-like annular flange 22 projecting generally axially inwardly and dimensioned to encircle the edge of a terminal flange 13 of the tire rim with the inner side of the cover adjacent such flange preferably hugging the tire rim edge in snug rattle-free and dirt-tight relation.

At its inner margin, the cover member 20 is formed with a generally radially inwardly and axially outwardly oblique annular reinforcing and wheel body engaging flange 23. The juncture of the body of the cover 20 and the flange 23 is formed on a small radius to minimize the depth or sharpness of the reentrant corner and to render the same easily cleaned of dust or dirt. This formation also thereby avoids concentration of bending stress at the juncture and enables the body part of the cover and the flange to be relatively flexed substantially, within limits, and with frequency without danger of breaking.

The inner marginal cover flange 23 is adapted to seat flatwise against the wheel body 11.

The means for retaining the cover 20 in place on the wheel comprises a groove 24 in the wheel body 11 opening generally radially outwardly and defined at the axially inner side by that portion of the wheel body against which the flange 23 abuts. At the axially outer side the groove 24 is defined by a generally radially outwardly and axially inwardly facing annular shoulder 25 formed by an integral bend in the wheel body at the radially outer base portion of the nose 14. The radially outermost extent of the shoulder 25 merges as a rounded radially outwardly projecting annular nose 26 with the reinforcing nose portion of the wheel body.

The diameter of the cover retaining groove 24 is preferably slightly greater than the inside diameter of the flange 23 prior to assembly with the wheel. The axially inward disposition of the groove 24 with respect to the edge of the tire rim terminal flange 13 is such that in the assembled relationship of the cover the flange 23 is in firm gripping relation within the groove 24 and is stressed radially outwardly and axially inwardly to hold the cover 20 under slight axially inward stress or tension to maintain the outer margin of the cover snugly against the tire rim terminal flange 13.

The retaining shoulder nose 26 is in sufficient overlapping relation to the edge of the cover flange 23 so that the juncture of the flange within the groove 24 is effectively concealed, and the overall visual effect is pleasingly symmetrical and ornamental.

By reason of the resiliently deflectable nature of the cover 20 and especially the flange 23, the cover 20 is adapted to be mounted upon the wheel by placing the cover in general concentricity with respect to the shoulder nose 26 and with a portion of the flange 23 in engagement within the retaining groove 24 and then, as shown in Fig. 3, pressing inwardly against the remaining portion of the cover as by finger pressure applied at the inner marginal portion of the cover to flexibly cam the flange 23 over the nose 26 until the edge of the flange snaps into position behind the shoulder 25 into the groove 24. In this process, the contiguous areas of the cover body may flex sympathetically substantially as shown.

After the cover 20 has been mounted it is effectively retained upon the wheel and will not be dislodged by either inward flexing such as may result from engagement with an obstruction in the operation of the vehicle or effected manually as for example to render accessible to an air hose or the like a valve stem 27 (Fig. 1) projecting through a suitable aperture in the cover, or outward deflection as may be effected manually for obtaining access behind the cover for any reason.

The relationship of the inner marginal cover flange 23 and the retaining groove 24 and shoulder 25 may be such that once the flange 23 has been retainingly interlocked therewith the cover cannot be removed without destroying the flange 23, thereby rendering the cover 20 entirely theft-proof. For some purposes, however, it may be desirable to render the cover removable at will. To this end, the width of the flange 23 and its inclination, and the particular slope and length of the shoulder 25 are so related that it is possible to remove the cover in the manner indicated in Fig. 4. By turning a selected portion of the cover 20 radially inwardly from its outer margin upon itself, the contiguous portion of the retaining flange 23 is drawn away from the wheel body and tilted cammingly against the shoulder 25 and the nose 26. Thus, the flange 23 extends in a generally axially inward direction and then slides axially outwardly in response to a pull on the cover 20 until it is released from the shoulder and nose. This relieves the interlocking engagement of the remainder of the flange 23 so that the cover drops away from the wheel.

This is an advantageous relationship since it permits an automobile to be equipped with only four of the cover members 20. The spare wheel can be equipped with the cover removed from the wheel which the spare wheel replaces at any time. Where the relationship of the cover flange 23 and the retaining structure on the wheel is such that the cover is held permanently, there must, of course, be five of the wheel covers in a set since the spare wheel must carry its own cover in permanent assembly therewith.

Because of the form-sustaining resilient deflectability of the material of the cover it can be deflected as extremely as required for mounting or removal of the cover without permanent deformation, instantaneously springing back to its predetermined shape when released from the deflecting force or pressure.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a wheel structure including a tire rim and a load-bearing part, the load-bearing part having an annular generally radially outwardly and axially inwardly facing shoulder spaced radially inwardly from the juncture of the body part and the tire rim, a cover member dimensioned to extend in concealing relation to the tire rim and said juncture and having a resiliently flexible radially inner portion interengaging with and behind said shoulder to retain the cover on the wheel, said interengaging portion of the cover member comprising a generally radially inwardly and axially outwardly extending flange having the extremity thereof on a smaller diameter than the radially outermost projecting portion of said shoulder and being adapted to snap into engagement behind the shoulder in response to axially inward pressure thereagainst.

2. In a wheel structure including a tire rim and a load-sustaining body part, a sheet plastic flexibly resilient cover member for ornamentally concealing the outer side of the tire rim and the tire rim juncture portion of the body part and having an inner marginal generally radially inwardly and axially outwardly extending annular flange which not only reinforces the inner margin of the cover but also seats directly against the body part of the wheel spaced radially inwardly from the juncture of the rim and body part, the wheel body part having an integral cover retaining annular generally radially outwardly opening groove within which the edge of said flange is interlockingly engaged, the axially outer portion of said groove extending radially outwardly in concealing relation to the juncture of the edge of said flange with the body part in said groove.

3. In a wheel structure including a tire rim and a load-sustaining body part, a sheet plastic flexibly resilient cover member for ornamentally concealing the outer side of the tire rim and the tire rim juncture portion of the body part and having an inner marginal generally radially inwardly and axially outwardly extending annular flange which not only reinforces the inner margin of the cover but also seats directly against the body part of the wheel spaced radially inwardly from the juncture of the rim and body part, the wheel body part having an integral cover retaining annular generally radially outwardly opening groove within which the edge of said flange is interlockingly engaged, the axially outer portion of said groove extending radially outwardly in concealing relation to the juncture of the edge of said flange with the body part in said groove, the construction and relationship of the inner marginal flange of the cover and the overhanging, retaining portion of the body member at the axially outer side of the cover retaining groove being such that the cover is adapted to be assembled with the wheel structure by simple axially inward pressure against the cover adjacent to the inner marginal flange whereby to stretch the flange by cammingly moving it axially inwardly thereby until the flange snaps into the retaining groove.

4. In a wheel structure including a tire rim and a load-sustaining body part, a sheet plastic flexibly resilient cover member for ornamentally concealing the outer side of the tire rim and the tire rim juncture portion of the body part and having an inner marginal generally radially inwardly and axially outwardly extending annular flange which not only reinforces the inner margin of the cover but also seats directly against the body part of the wheel spaced radially inwardly from the juncture of the rim and body part, the wheel body part having an integral cover retaining annular generally radially outwardly opening groove within which the edge of said flange is interlockingly engaged, the axially outer portion of said groove extending radially outwardly in concealing relation to the juncture of the edge of said flange with the body part in said groove, the relationship and construction of the retaining groove and shoulder structure of the wheel body part and the inner marginal reinforcing and retaining flange of the cover being such that the cover can be manually removed from the wheel by flexing a portion thereof to turn it upon itself and pulling such portion radially inwardly whereby to turn the inner marginal flange portion contiguous to such cover portion into a generally axially inwardly extending direction and then sliding it axially outwardly past the retaining shoulder of the groove.

5. In combination in a wheel and cover assembly, the wheel comprising a tire rim and a wheel body having an annular generally radially opening groove therein, and a circular wheel cover having a marginal portion interfitting flexibly in cover retaining relation in said groove, said marginal portion of the cover being in the form of a flange seating flatwise against the wheel body and bearing edgewise in said groove.

6. In a wheel structure including a tire rim and a load-sustaining body part, the body part having an annular generally radially outwardly and axially inwardly extending shoulder adjacent to but spaced radially inwardly from the juncture of the tire rim and body part, and a cover extending in concealing relation to the tire rim in a generally radially and axially inward direction and having an inner marginal divergent generally radially inwardly and axially outwardly extending generally frusto-conically shaped flange seating against the body part and having the edge thereof retainingly engaging said shoulder and concealed thereby.

GEORGE ALBERT LYON.

REFERENCES CITED

The following references are of record in the file of this patent:

UNITED STATES PATENTS

| Number | Name | Date |
| --- | --- | --- |
| 2,386,225 | Lyon | Oct. 9, 1945 |